United States Patent
Yang

(10) Patent No.: US 9,818,995 B2
(45) Date of Patent: Nov. 14, 2017

(54) BATTERY PACK SYSTEM

(71) Applicant: Congming Yang, Huzhou (CN)

(72) Inventor: Congming Yang, Huzhou (CN)

(73) Assignee: MICROVAST POWER SYSTEMS CO., LTD., Huzhou, Zhejiang Province (CN)

(*) Notice: Subject to any disclaimer, the term of this patent is extended or adjusted under 35 U.S.C. 154(b) by 0 days.

(21) Appl. No.: 14/324,401

(22) Filed: Jul. 7, 2014

(65) Prior Publication Data

US 2017/0069889 A1  Mar. 9, 2017

(51) Int. Cl.
  *H01M 2/10* (2006.01)
  *H01M 10/48* (2006.01)

(52) U.S. Cl.
  CPC ....... *H01M 2/1094* (2013.01); *H01M 2/1077* (2013.01); *H01M 10/48* (2013.01); *H01M 2220/20* (2013.01)

(58) Field of Classification Search
  CPC .... H01M 2/1094; H01M 2/1077; H01M 2/12; H01M 10/48; H01M 2220/20; H01M 2002/0205; H01M 2/0217; H01M 2/1016; H01M 2/10; H01M 2/00
  USPC ......................................... 429/53
  See application file for complete search history.

(56) References Cited

U.S. PATENT DOCUMENTS 6,106,972 A * 8/2000 Kokubo ............. H01M 2/1083
  429/120
9,166,262 B2 * 10/2015 Souki ................ H01M 10/6566

2005/0269995 A1  12/2005 Donnelly et al.
2012/0183815 A1 * 7/2012 Johnston ............... B60L 3/0046
  429/50
2013/0183552 A1 * 7/2013 Yang .................. H01M 2/1077
  429/51
2015/0188203 A1 * 7/2015 Enomoto .......... H01M 10/6568
  429/83

FOREIGN PATENT DOCUMENTS

| CN | 201413858 Y | 2/2010 |
| CN | 201528026 U | 7/2010 |
| CN | 102227831 A | 10/2011 |
| CN | 202550023 U | 11/2012 |

(Continued)

*Primary Examiner* — Stewart Fraser
*Assistant Examiner* — Rashid Alam
(74) *Attorney, Agent, or Firm* — Cheng-Ju Chiang

(57) ABSTRACT

The present invention relates to a battery pack system, comprising: a plurality of battery cells, sealing fluid and a battery pack case. The battery cells are immersed in the sealing fluid in the battery pack case, which includes a box and a top cover. The case is equipped with an inlet port and an outlet port. The outlet port is connected with the inlet port through a circulation pump and a buffer vessel, forming a circular route; some sensors are configured in the buffer vessel. When an electrolyte leakage occurs in the battery pack, it is confined in the sealing fluid, preventing the electrolyte to be exposed to air and further catch on fire. When the mixed fluid circulates through the buffer vessel, the sensors detect the leakage at once and send out warnings to the battery system to increase its safety level. The leaked flammable gases are separated from the circulation channel and get released to avoid too high internal pressure and consequently break the battery box.

9 Claims, 3 Drawing Sheets

(56) References Cited

FOREIGN PATENT DOCUMENTS

| | | |
|---|---|---|
| CN | 202662693 U | 1/2013 |
| CN | 203166035 U | 8/2013 |
| JP | WO 2014045628 A1 * | 3/2014 ........ H01M 10/6568 |

* cited by examiner

BATTERY PACK SYSTEM

FIELD OF THE INVENTION

The present invention relates to generally a battery pack system, more specifically the present invention relates to a battery pack system, capable of detecting the leakage of batteries.

BACKGROUND

Currently traditional internal combustion automobiles and buses are gradually replaced by electric vehicles. Battery cells are the prime energy storage devices for electric vehicles. While the battery pack case as the container of battery cells is one of the key components of electric vehicles that directly affects the performance of battery cells. These key components further affect the performance of electric vehicles. Because of the excellent energy and power output and long life of lithium ion batteries, they are widely used in electric vehicles nowadays.

Battery assembly is composed of battery cells connected either in series, or in parallel. When a lithium ion battery is being charged, the aprotic solvent in the electrolyte reacts at the interface of electrode and electrolyte. The reaction forms the passivation layer covering on the electrode surface and generating hydrogen, hydrocarbons, carbon monoxide, carbon dioxide and other gases thereby increasing the internal pressure of the battery cell. This pressure severely impacts the cycle life and the safety of the battery. As the gas generation increases, the internal pressure of the battery cell increases. When it is high enough, the battery package material ruptures. Flammable gas may fill the whole battery pack. If the situation continues, the flammable gas will rupture the battery pack case. When the flammable gas meets the air, the battery pack is extremely vulnerable to explosion.

Therefore to address the above inefficiency, it is desirous to have a battery pack system, capable of detecting the leakage of batteries.

SUMMARY OF THE INVENTION

The present invention will now be described more specifically with reference to the following embodiments. It is to be noted that the following descriptions of preferred embodiments of this invention are presented herein for the purpose of illustration and description only. It is not intended to be exhaustive or to be limited to the precise form disclosed.

The detailed descriptions of this current invention set forth below in connection with the drawings and examples are preferred embodiments of the current invention and are not limited to represent the only embodiments and forms described hereinafter.

The invention relates to a battery pack system, wherein the heat dissipation and the safety of the system can be enhanced.

The invention relates to a battery pack system. The system comprises: a plurality of battery cells, a sealing fluid, and a battery pack case. The battery cells are immersed in the sealing fluid in the battery pack case. The battery pack case includes a box and a top cover, a plurality of battery cells that are connected to an external circuit by a set of relays. The box is equipped with an inlet port and an outlet port; the outlet port is coupled to the inlet port through a circulation pump and a buffer vessel to form a circular route; a set of sensors is associated or configured within the buffer vessel.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
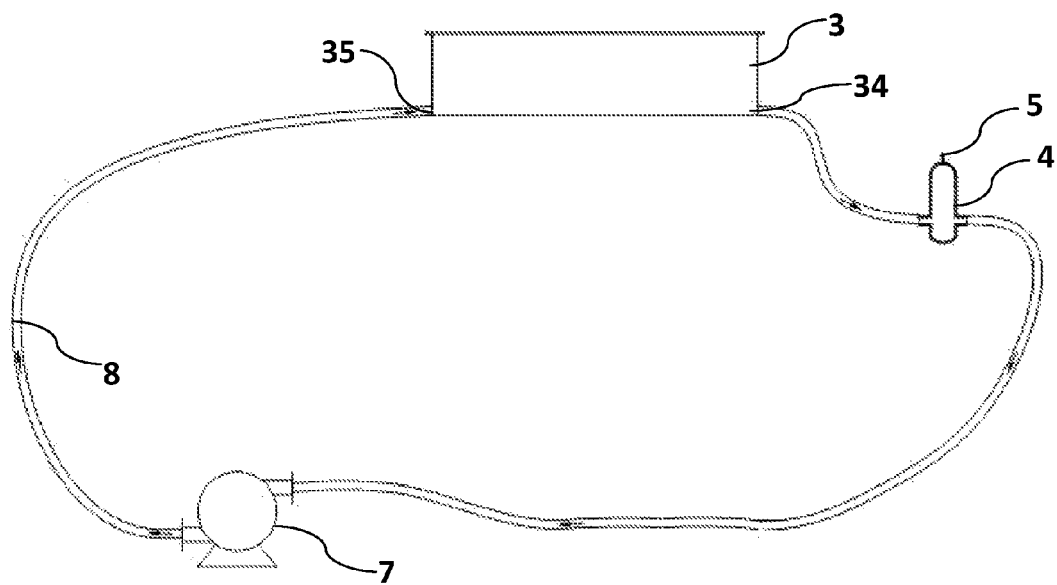
FIG. 1 shows the schematic diagram of an assembled battery.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in a battery pack system, capable of detecting the leakage of batteries. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. It will be understood that, although the terms first, second, etc. may be used herein to describe various elements, these elements should not be limited by these terms. These terms are only used to distinguish one element from another.

Embodiments will now be described more fully with reference to the accompanying drawings, in which exemplary embodiments are shown. Like reference numerals refer to like elements throughout. In the drawings, the same or corresponding elements are denoted by the same reference numerals, and a repeated explanation thereof will not be given.

Figure 2:
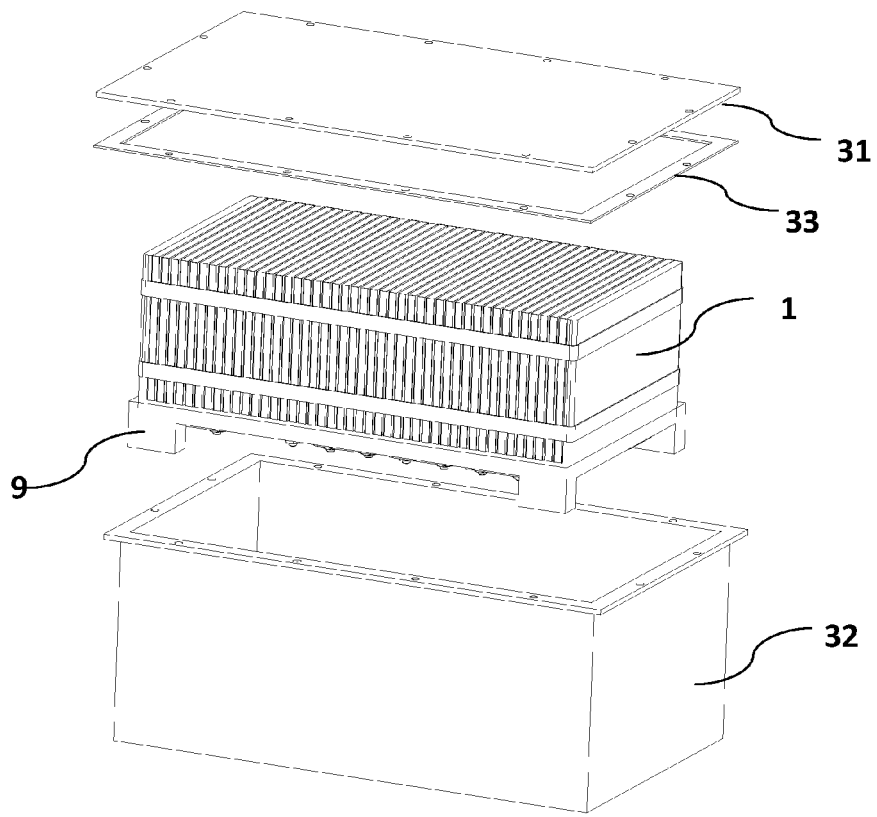
FIG. 2 shows the explosion diagram of the battery pack case.
Figure 3:
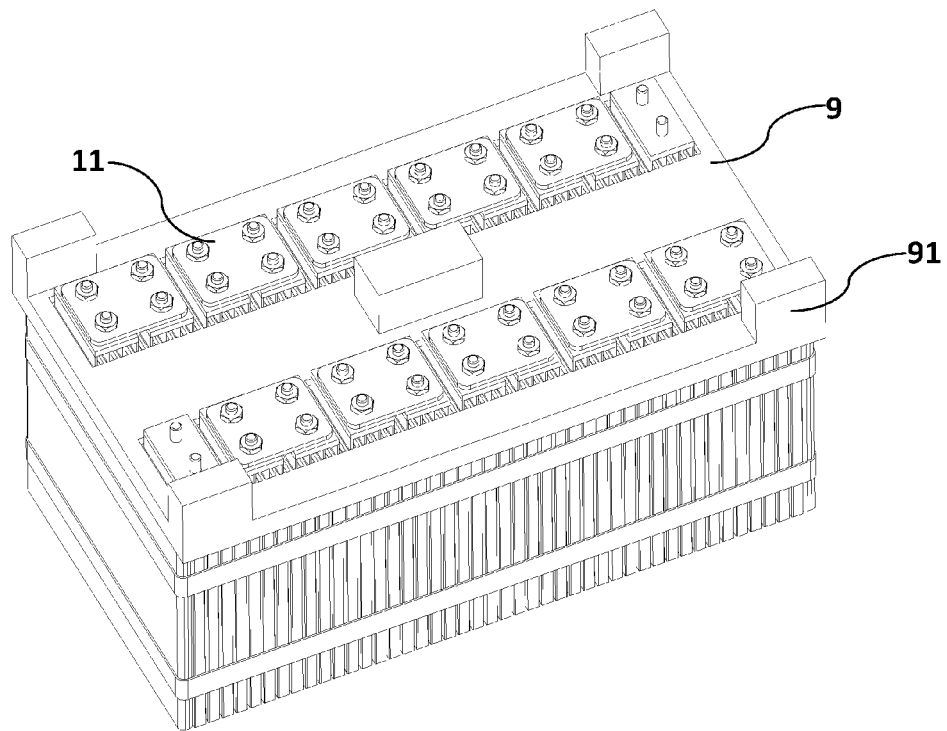
FIG. 3 shows the structure diagram of a battery cell combined with the supporting frame.
Figure 4:
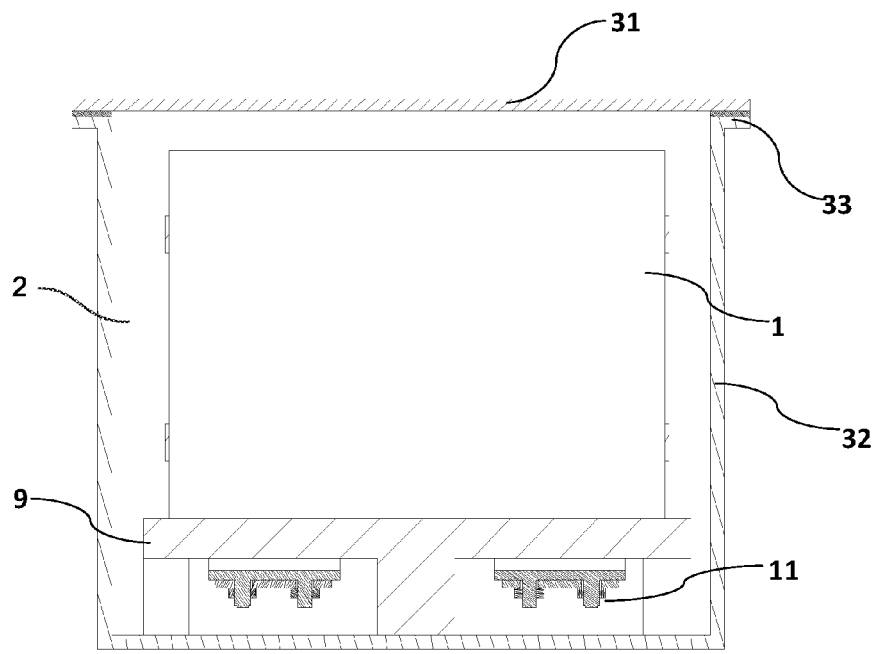
FIG. 4 shows the side view of the battery pack case housing battery cells.
Figure 5:
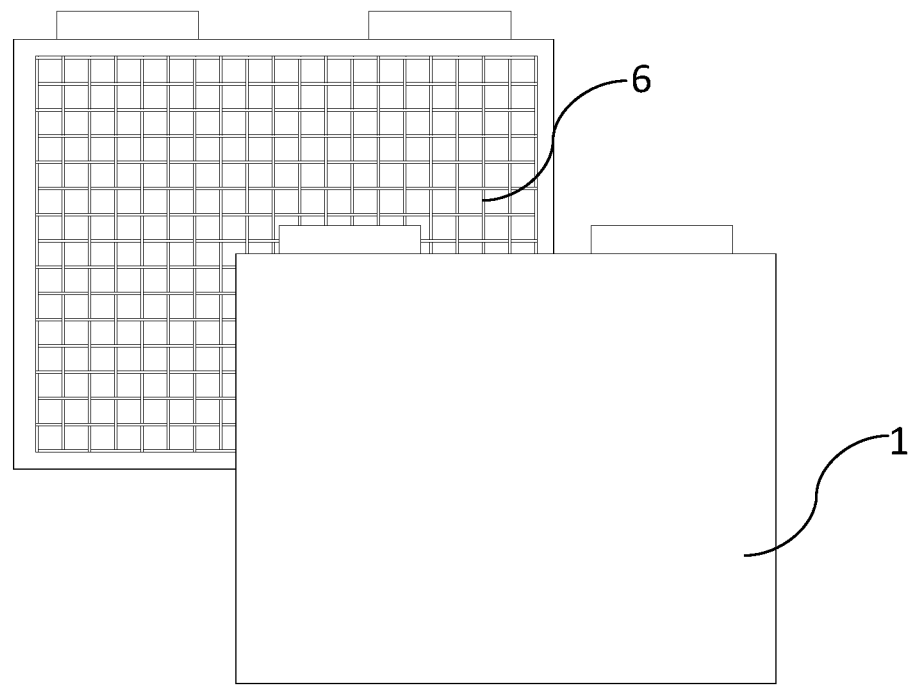
FIG. 5 shows the schematic diagram of a battery cell combined with an isolating unit.

Referring from FIG.1 to FIG.5, a battery pack case 3 comprising a box 32 and a top cover 31 is provided. A sealing gasket 33 is arranged or disposed between the box 32 and the top cover 31. The box 32 protects the internal components and prevents same from exposure to ambient air. Battery cells 1 may be formed by a set of sheet battery cells. The sheet battery cells are stacked together forming assembled battery cells 1 in the box 32. An isolating unit 6 is sandwiched between each two adjacent battery cells 1. In this embodiment, the isolating unit 6 is a plastic mesh, whose longitude and latitude lines are not formed in the same plane. Battery cells 1 are separated by the isolating units 6 to facile the flow of the electrolyte into the sealing fluid. Metal meshes can also be used as isolating units 6, but will affect the electrical insulation of the whole system, and they are corroded easily by the electrolyte. Further, other types of meshes with good isolating performance are contemplated in this present invention.

In this embodiment, relays are configured into or disposed within the sealing fluid 2, the sealing fluid 2 is silicone oil, and the silicone has steady fire retarding features and isolating performance.

The surface of tab-leads 11 of battery cells 1 are covered with supporting frame 9. The supporting points 91 are set at the four corners of the supporting frame 9. The battery cells are placed in the battery pack case 3 invertedly. Therefore, the tab-leads 11 of the battery cell 1 are configured or disposed upside down, and the supporting flame 9 is supporting all the battery cells 1. The supporting points 91 are directly in contact with the bottom of the battery pack case 3 and the silicone oil can flow through the gap in the supporting frame 9. It should be noted that by placing battery cells invertedly the present invention contemplates a revolutionary approach wherein the known or prior art battery cells are turned upside down in the battery pack case 3 to achieved one of the desired effect of the present invention.

The two sides of the battery pack case 3 are configured or disposed with two holes. The two holes are the sealing fluid inlet port 35 and outlet port 34 respectively. The circulation channel 8 connects two ports and forms a pathway, the buffer vessel 4 is configured on or disposed within the pathway, the hydrogen sensors 5 are configured or disposed in the buffer vessel 4. The battery pack case 3, the buffer vessel 4 and the circulation channel 8 form a sealing system. The sealing fluid 2 circulates in this pathway and brings hydrogen into the buffer vessel 4. The buffer vessel 4 collects the hydrogen mixed in the circulation channel, which can be detected by the hydrogen sensors 5.

In this embodiment, the system can cool the assembled battery cells, and also detect the leaked hydrogen from the battery cells 1.

The present invention relates to a battery pack system, comprising: a plurality of battery cells, sealing fluid and a battery pack case. The battery cells are immersed in the sealing fluid in the battery pack case, which includes a box and a top cover. The box is equipped with an inlet port and an outlet port. The outlet port is connected with the inlet port through a circulation pump and a buffer vessel, forming a circular route; some sensors are configured or disposed in the buffer vessel. The buffer vessel separates the gas from the sealing liquid and collects the gas.

Preferably, the buffer vessel is equipped with a one-way exhaust valve.

When the buffer vessel collects certain amount of gas, the one-way exhaust valve opens and releases the collected gas.

Preferably, the said sealing fluid is selected from the silicone oil and/or the transformer oil.

The silicone oil and transformer oil have better flame resistance and electrical insulation. The leak-proof gasket configured or disposed between the box and the top cover is conducive to the sealing of the battery pack case.

Preferably, the said sensors are selected from one or more type of sensors such as pressure sensor, hydrogen sensor, alkane sensor and carbon dioxide sensor.

The pressure sensor can detect the increase of the pressure in the buffer vessel caused by the generation of the gas; the hydrogen sensor, alkane sensor and carbon dioxide sensor can accurately detect the composition of the gas in the buffer vessel accordingly, and send out the reliable detection results.

Preferably, the battery cells are placed invertedly, to effectively reduce the amount of sealing fluid and meet the needs of heat dissipation and the sealing of electric components.

Preferably, the bottom of the box is configured or disposed with supporting frames to support the battery cells, so that the tab-leads of the cells don't contact the bottom of battery box and not to be pressed by the supporting frames. This structure helps battery pack to be configured stably. In other words, this increase the stability of the battery pack system as compared to prior art ones.

Preferably, the battery cells consist of a plurality of sheet battery cells with an isolating unit configured or disposed between two adjacent cells. Battery cells are separated by isolating units, to improve the circulation of the sealing fluid, and help to discharge the leaked gas through the circulation channel.

Preferably, the isolating units are meshes to separate the cells. The longitude and latitude lines of the mesh are not in the same plane to increase the space between cells and facile the circulation of the fluids. The longitude lines are at the vertical direction of the mesh and the latitude lines are at the horizontal direction of the mesh.

Preferably the sealing gasket is configured or disposed between the box and the top cover to isolate the air and hence reduce the effect of air on all components inside of battery pack case.

Using the technical solutions provided by the present invention, one can seal the leaked electrolyte within the sealing fluid and prevent the electrolyte to be exposed to the air and avoid burning. The leaked flammable gases are separated from the circulation channel and released to avoid too high internal pressure, and consequently break the battery box. The battery cells are configured or disposed invertedly to effectively reduce the amount of sealing fluid, enhance the cooling effect, and reduce the cost and the weight of the battery pack. The sensors can detect the leaked of the electrolyte within the battery pack box, and send out warnings to improve the safety of battery pack. In an image transmission/communication system in which an application with ultra-low bandwidth and runtime constrains is provided.

The present invention contemplates using a battery system for a type of electric vehicle. The vehicle may be an all-electric vehicle or a hybrid vehicle.

The present invention relates to a battery pack system, comprising: a plurality of battery cells, sealing fluid and a battery pack case. The battery cells are immersed in the sealing fluid in the battery pack case, which includes a box and a top cover. The case is equipped with an inlet port and an outlet port. The outlet port is connected with the inlet port through a circulation pump and a buffer vessel, forming a circular route; some sensors are configured in the buffer vessel. When an electrolyte leakage occurs in the battery pack, it is confined in the sealing fluid, preventing the electrolyte to be exposed to air and further catch on fire. When the mixed fluid circulates through the buffer vessel, the sensors detect the leakage at once and send out warnings to the battery system to increase its safety level. The leaked flammable gases are separated from the circulation channel and get released to avoid too high internal pressure and consequently break the battery box.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," and terms of similar meaning should not be construed as limiting the item described to a given time period or to an item available as of a given time, but instead should be read to encompass conventional, traditional, normal, or standard technologies that may be available now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

What is claimed is:

1. a battery system, comprising: a plurality of battery cells, a sealing fluid, and a battery pack case; wherein the battery cells are immersed in the sealing fluid in the battery pack case, wherein the battery pack case includes a box and a top cover, a plurality of battery cells that are connected to an external circuit by a set of relays; wherein the box is equipped with an inlet port and an outlet port; the outlet port is coupled to the inlet port through a circulation pump and a buffer vessel to form a circular route; a set of sensors is associated or configured within the buffer vessel: the buffer vessel is configured to separate and collect gases mixed in the sealing fluid /circular route, and the sensors are one or more types of sensors selected from a hydrogen sensor, alkane sensor and carbon dioxide sensor, said sensors are configured to accurately detect a composition of the gas in the buffer vessel accordingly, and send out detection results.

2. The battery system of claim 1, wherein the buffer vessel is equipped with a one-way exhaust valve.

3. The battery system of claim 1, wherein the sealing fluid is silicone oil and/or transformer oil.

4. The battery system of claim 1, wherein the battery cells are invertedly placed.

5. The battery system of claim 4, wherein the bottom of box is configured with a supporting frame to support the battery cells.

6. The battery system of claim 4, wherein the assembled battery cells consist of a plurality of sheet battery cells; an isolating unit is configured between each two adjacent cells.

7. The battery system of claim 6, wherein the isolating unit is a mesh, and the longitude and the latitude lines of the mesh are not in the same plane.

8. The battery system of claim 1, further comprising a sealing gasket is configured between the box and the top cover.

9. The battery system of claim 1, wherein the bottom of box is configured with a supporting frame to support the battery cells.

* * * * *